United States Patent [19]

McKewan

[11] 4,334,814
[45] Jun. 15, 1982

[54] SELF-TAPPING SCREW FOR USE IN PLASTICS

[75] Inventor: Arthur J. McKewan, Rochester, Mich.

[73] Assignee: Microdot Inc., Darien, Conn.

[21] Appl. No.: 170,552

[22] Filed: Jul. 21, 1980

Related U.S. Application Data

[63] Continuation of Ser. No. 947,822, Oct. 2, 1978, abandoned.

[51] Int. Cl.³ .............................................. F16B 39/30
[52] U.S. Cl. .................................................. 411/311
[58] Field of Search .............. 411/311, 310, 309, 308, 411/301, 259, 414, 411, 413, 386

[56] References Cited

U.S. PATENT DOCUMENTS

| 1,075,310 | 10/1913 | Ulrich | 411/309 |
| 1,250,748 | 12/1917 | Woodward | 411/309 |
| 2,437,638 | 3/1948 | Evans | 411/311 |
| 2,679,774 | 6/1954 | MacDonald | 411/411 X |
| 3,076,208 | 2/1963 | Moore | 411/311 X |
| 3,286,579 | 11/1966 | Lovisek | 411/386 |
| 4,144,795 | 3/1979 | Gutshall | 411/413 |

Primary Examiner—Ramon S. Britts
Attorney, Agent, or Firm—Lyman R. Lyon

[57] ABSTRACT

A threaded fastener particularly suited for use with plastics having spaced apart threads and a negative rake or "hook" formed at the crest of certain of the threads so that axial force applied by the fastener in the direction of the head is translated in part towards the axis of the fastener, thus increasing the failure load of the screw assembly and eliminating premature stripping of the screw threads. Also disclosed is the preferred manner of making the threaded fastener of the present invention.

1 Claim, 7 Drawing Figures

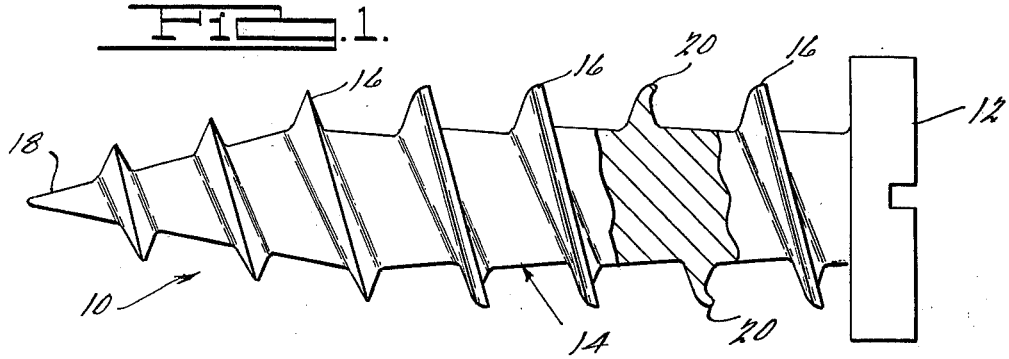
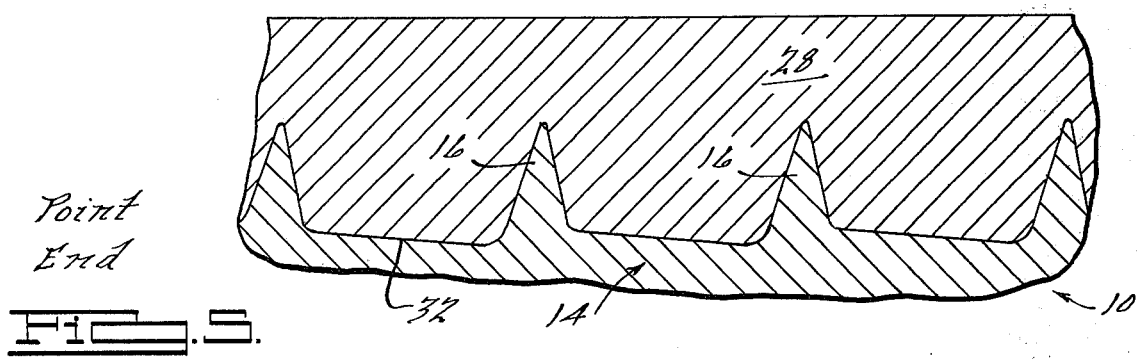
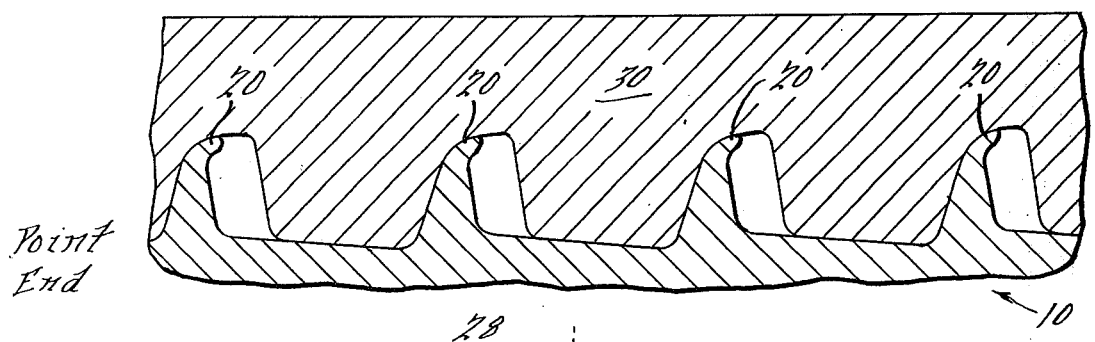
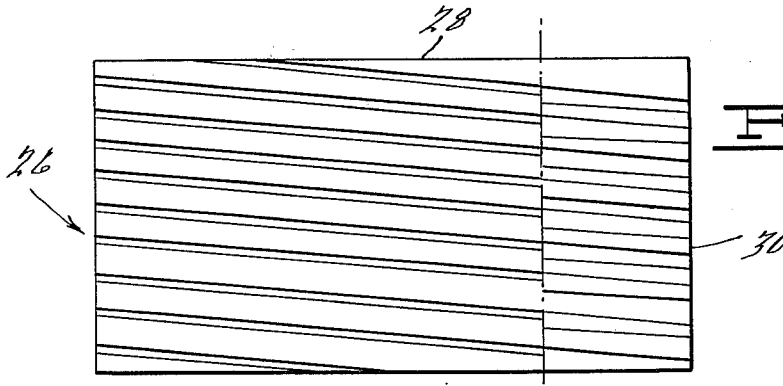
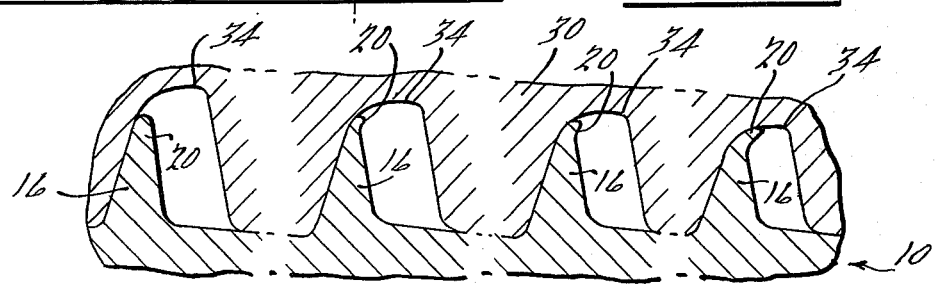

SELF-TAPPING SCREW FOR USE IN PLASTICS

This is a continuation, of application Ser. No. 947,822, filed Oct. 2, 1978, now abandoned.

BACKGROUND AND SUMMARY OF THE INVENTION

The present invention relates to threaded fasteners and in particular to a self-tapping screw for use in plastics.

There currently exists a number of threaded fastener products which are specifically adapted to use with plastics. The primary consideration in the design of such threaded fasteners is to balance the failure load of the metal screw thread to that of the plastic thread formed. The most significant development toward this end has been to widen the space between the threads and also to make the threads as deep as possible to provide a greater amount of plastic between the threads.

One of the drawbacks with this approach, however, is that when torque or tension is applied to the screw, the plastic material between the screw threads tends to move down the thread flank away from the axis of the screw, thus compressing the plastic outwardly causing premature stripping of the screw thread.

Accordingly, it is the primary purpose of the present invention to provide a self-tapping threaded fastener for use with plastic material that minimizes the problem of premature stripping by eliminating the outward compression of plastic material away from the threads. In particular, the self-tapping threaded fastener according to the present invention has a negative rake or "hook" formed on the top flank or crest of the threads so that when torque or tension is applied to the screw, the plastic material between the threads is forced inwardly toward the axis of the screw. Thus, the torque or tension load required to cause the screw assembly to fail is significantly increased.

Also disclosed herein is the preferred method for making a threaded fastener according to the present invention. More particularly, a two-part rolling die is used having a first part that produces the basic thread pattern and a second part that bends the crests of the threads upwardly towards the head of the screw to create the desired "hook" effect on the top flanks of the threads.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a plan view of a threaded fastener according to the present invention showing a partial cutaway of one of the threads thereof:

FIG. 4 is a sectional view illustrating the formation of the basic thread pattern by the two-part rolling die;

FIG. 5 is a sectional illustration of the formation of the negative rake or "hook" at the crests of the threads by the second part of the two-part rolling die;

FIG. 6 is a plan view of the two-part rolling die of the present invention; and

FIG. 7 is a sectional view illustrating the manner in which the crest of the thread is bent upwardly toward the head of the screw during the second part of the die rolling process.

DETAILED DESCRIPTION OF THE PREFERRED EMBODIMENT

Figure 2:
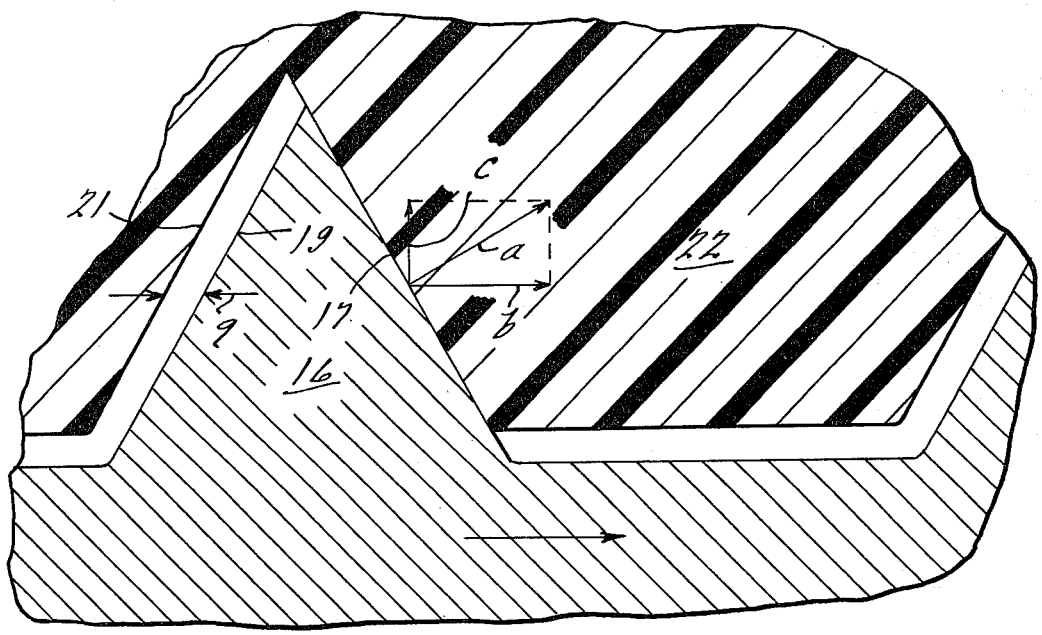
FIG. 2 is an enlarged sectional view of a prior art threaded fastener assembly.

Looking to FIG. 1, a plan view of a threaded fastener 10 according to the present invention is shown. The screw fastener 10 has a torque receiving head 12 of suitable construction and an elongated shank 14 extending from the head 12. As noted, the threaded fastener 10 of the present invention is intended primarily for use with plastics. Accordingly, the basic thread configuration of the fastener 10 has the threads 16 spaced apart and also of significant depth so that the root diameter of the shank 14 is substantially less than the thread diameter. Since the threaded fastener 10 shown in the preferred embodiment is also intended to be self-tapping, the point 18 of the screw is designed to prevent shearing of the plastic when the screw is threaded into a workpiece.

As best shown by the cutaway section of the shank 14, the threads 16 along the fixed-diameter portion of the shank 14 have a negative rake or "hook" 20 formed at their crests. The purpose of the hook 20 is to translate in part the axial force applied by the fastener 10 inwardly toward the axis of the screw. In this manner, the plastic material between the screw threads 16 will similarly be compressed inwardly toward the shank 14 of the screw 10 rather than outwardly away from the threads 16 as occurs with conventional thread designs. Thus, the torque or tension load to which a screw assembly utilizing a threaded fastener according to the present invention can be subjected without stripping the threads formed in the plastic is significantly increased.

Figure 3:
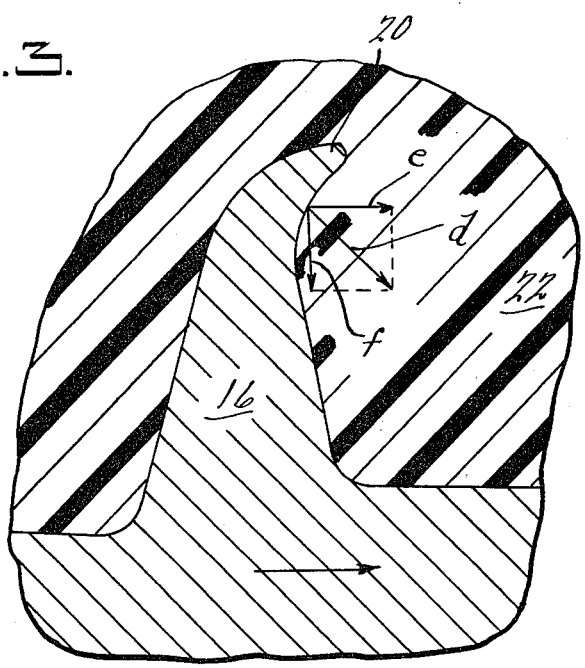
FIG. 3 is an enlarged sectional view of a threaded fastener assembly according to the present invention.

Referring now to FIGS. 2 and 3, the function of the "hook" design will be explained in greater detail. In FIG. 2, an enlarged sectional view of a conventional thread design is shown. The axial tension of the fastener can be represented by the force vector "a" perpendicular to the flank 17 of the thread 16. Force vector "a" can in turn be broken down into its vector components "b" and "c". As thus becomes apparent, vector component "c" of the force vector "a" is acting to compress the plastic material 22 between the threads 16 outwardly away from the axis of the screw, thereby creating a gap "g" between the leading sides 21 of the internal plastic threads and the trailing sides 19 of the screw threads. As the amount of axial tension increases, the gap "g" widens eventually causing stripping of the internal threads.

In FIG. 3, an enlarged sectional view of a thread design according to the present invention is shown. In this instance the axial force exerted by the screw is represented by the force vector "d", perpendicular to the curl 20 at the crest of the thread 16. When force vector "d", however, is broken down into its vector components "c" and "f", it can be seen that force component "f" is acting to compress the plastic material 22 between the threads 16 inwardly towards the axis of the screw. In this manner, the outward compression of plastic material is eliminated, thereby significantly increasing the torque or tension load required to cause the screw assembly to fail.

Turning now to FIGS. 4–7, the preferred manner in which the threaded fastener 10 of the present invention is made will be explained. The threads 16 of the fastener 10 are formed by a two-step process utilizing the two-part rolling die 26 illustrated in FIG. 6. The first part 28 of the rolling die 26 is adapted to form the conventional thread pattern illustrated in FIG. 5 with the threads 16 of the fastener 10 spaced apart and of substantial depth. In addition, it will be noted that the first part 28 of the rolling die 26 also forms a slight wedge angle 32 in the shank 14 between the threads 16 of the screw 10. The purpose of the wedge angle 32 is to prevent the screw 10 from "riding up" the die 26 as flank pressure is applied to bend the thread crests 20 during the second rolling step.

The negative rake or "hook" 20 is formed at the thread crests by the second part 30 of the rolling die 26. With particular reference to FIG. 7, it can be seen that the depth of the die groove 34 gets progressively shallower as the screw 10 is rolled along the second part of the die 30, thereby bending the crest 20 of the thread 16 upwardly towards the head of the screw 10 to create the desired hook effect. The finished roll thus appears as illustrated in FIG. 5 with the thread crests 20 completely formed as required.

While the above description constitutes the preferred embodiment of the invention, it will be appreciated that the invention is susceptible to modification, variation and change without departing from the proper scope or fair meaning of the accompanying claims.

What is claimed is:

1. A threaded fastener having a rolled threadform comprising an elongated threaded shank and a torque receiving head at one end thereof, the threads of said fastener being characterized by a negative rake formed at the crest of at least some of said threads so that axial force exerted by the threads of said fastener on a workpiece in the direction of said head is in part translated inwardly toward the axis of said fastener, the crest of said negatively raked threads extending axially toward the head of said fastener an amount sufficient to intercept a radial plane drawn through the juncture of the negatively raked flank and the root of said thread, the root of said threads being of truncated conical configuration tapering radially inwardly toward said head so as to create a slight wedge angle in said shank between adjacent threads whereby an axial force exerted by a rolling die on the crest of said threads in the direction of the head of said fastener to create said negative rake is countered by an axial force exerted by said rolling die on the root of the threadform of said fastener in a direction away from the head of said fastener.

* * * * *